Figure 1:
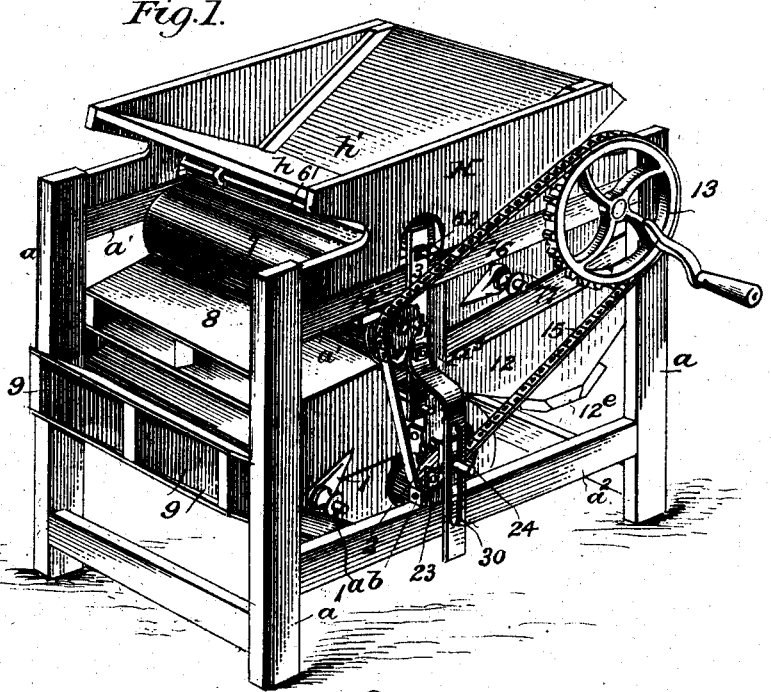

T. J. HATFIELD & F. N. WULLENWABER.
SEED CLEANER AND GRAIN SEPARATOR.
APPLICATION FILED MAR. 13, 1908.

907,348.

Patented Dec. 22, 1908.

3 SHEETS—SHEET 1.

WITNESSES:
H. Woodard
Charles H. Wagner.

INVENTORS
T. J. Hatfield
F. N. Wullenwaber
BY
Fred G. Dieterich & Co.
ATTORNEYS

T. J. HATFIELD & F. N. WULLENWABER.
SEED CLEANER AND GRAIN SEPARATOR.
APPLICATION FILED MAR. 13, 1908.
907,348.
Patented Dec. 22, 1908.
3 SHEETS—SHEET 2.
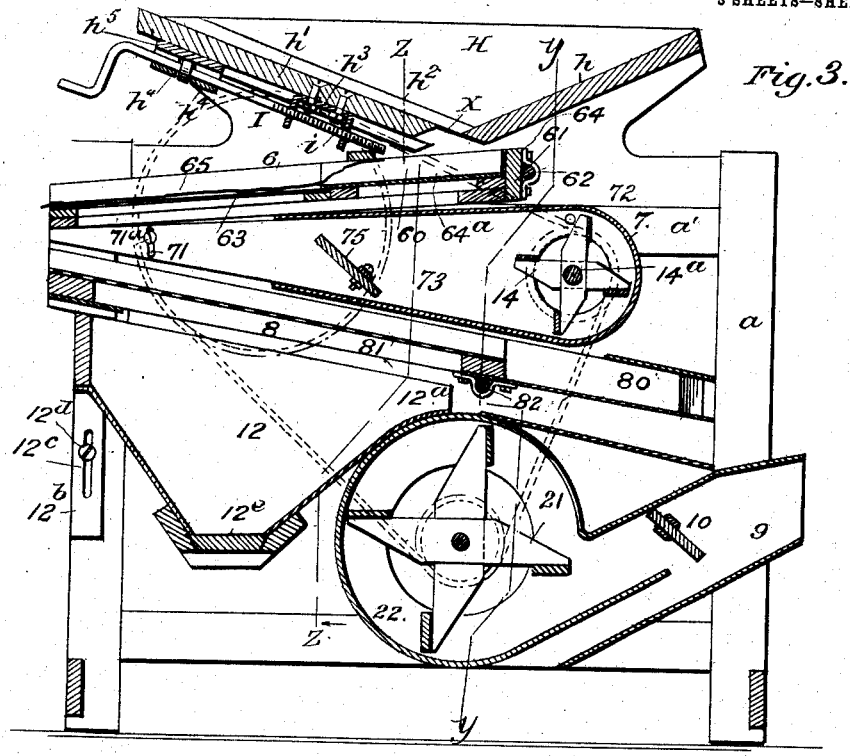
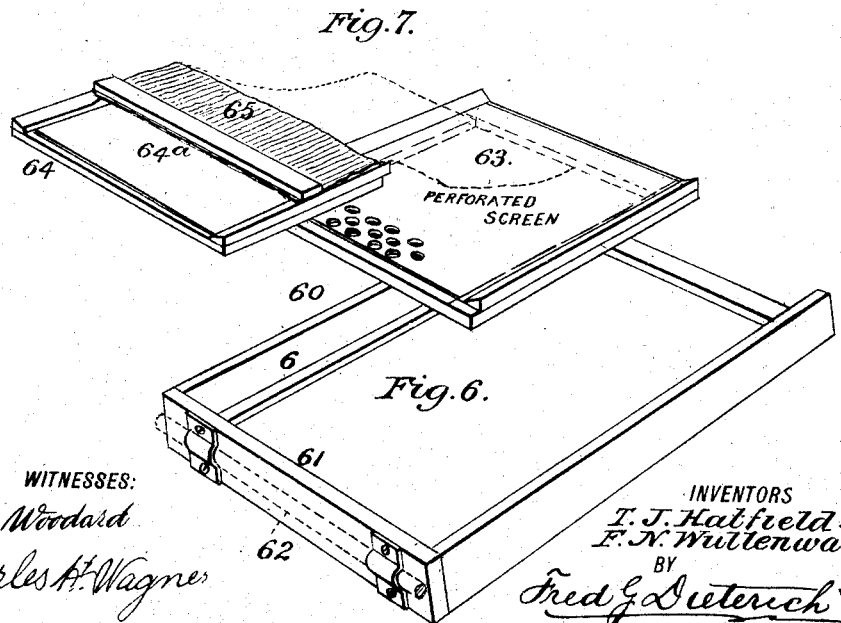
WITNESSES:
H. Woodard
Charles H. Wagner
INVENTORS
T. J. Hatfield
F. N. Wullenwaber
BY
Fred G. Dieterich & Co
ATTORNEYS
THE NORRIS PETERS CO., WASHINGTON, D. C.

T. J. HATFIELD & F. N. WULLENWABER.
SEED CLEANER AND GRAIN SEPARATOR.
APPLICATION FILED MAR. 13, 1908.
907,348.
Patented Dec. 22, 1908.
3 SHEETS—SHEET 3.
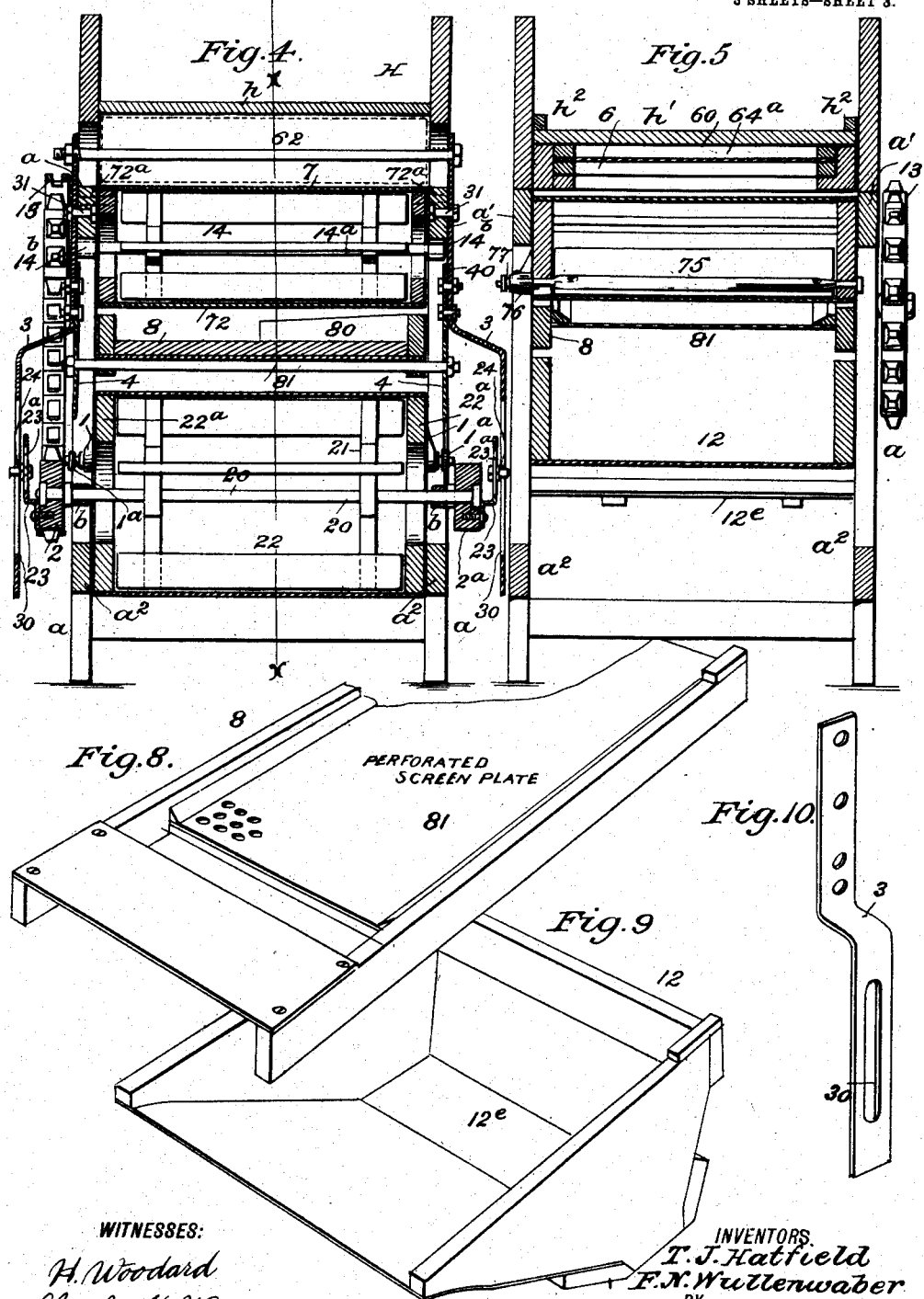
WITNESSES:
H. Woodard
Charles H. Wagner
INVENTORS
T. J. Hatfield
F. N. Wullenwaber
BY
Fred G. Dieterich
ATTORNEYS

UNITED STATES PATENT OFFICE.

THOMAS J. HATFIELD AND FREDERICK N. WULLENWABER, OF SEWARD, NEBRASKA, ASSIGNORS OF TWO-THIRDS TO SAID WULLENWABER AND ONE-THIRD TO DANIEL J. HARTRUM, OF SEWARD, NEBRASKA.

SEED-CLEANER AND GRAIN-SEPARATOR.

No. 907,348.     Specification of Letters Patent.     Patented Dec. 22, 1908.

Application filed March 13, 1908. Serial No. 420,927.

*To all whom it may concern:*

Be it known that we, THOMAS J. HATFIELD and FREDERICK N. WULLENWABER, residing at Seward, in the county of Seward and State of Nebraska, have invented a new and Improved Seed-Cleaner and Grain-Separator, of which the following is a specification.

Our invention primarily has for its object to provide a seed cleaner and grain separating machine for handling all kinds of grain in an economical and expeditious manner, and in which the parts are coöperatively so combined and adjustably arranged as to provide for separating corn and grading the same for planting purposes; for cleaning rice, and separating the red grains from the white grains.

Our invention comprehends generally, an improved construction and arrangement of parts including a receiving hopper, upper or chaff separating shoe and a lower or grading shoe, an upper and lower fan drum and a screening box under the lower shoe, the several parts having such correlative combination so that they are readily adjustable to any desired slant or position for carrying off the grain during the process of cleaning and separating same.

In its more complete nature, our invention embodies an improved construction and arrangement of the upper or chaff shoe so the said shoe will receive any grain necessary for coöperating therewith, it also having a blank surface at the upper end independent of the screen surface, adjustably and removably held and having combined therewith a flexible covering for all of the screens used in the upper shoe.

In its more subordinate features our invention consists in certain details of construction and peculiar combination of parts, all of which will be hereinafter fully explained, specifically pointed out in the appended claims and illustrated in the accompanying drawings, in which:—

Figure 2:
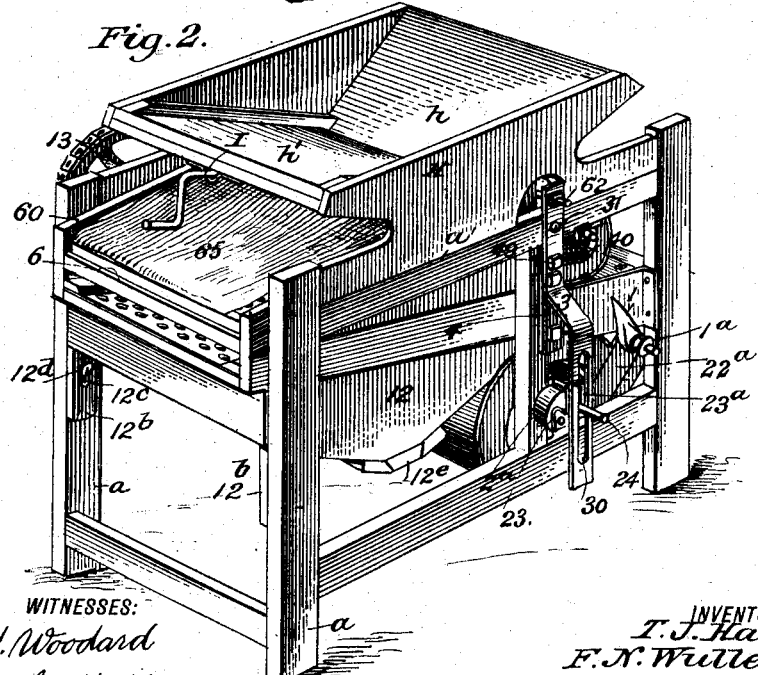

Figure 1, is a perspective view of our machine, looking at the operative side. Fig. 2, is a similar view looking at the opposite side thereof. Fig. 3, is a vertical longitudinal section of our machine, taken substantially on the line X—X of Fig. 4. Fig. 4, is a transverse section of the same on the line Y—Y of Fig. 3. Fig. 5, shows a similar view of the same on the line Z—Z of Fig. 3. Fig. 6, is a perspective view of the upper or chaff shoe frame. Fig. 7, shows the blank surface and screen members that form a part of the upper chaff shoe. Fig. 8, is a perspective view of the lower chaff shoe. Fig. 9, is a detail view of the loosely and adjustably supported chaff box, and Fig. 10, is a detailed view of one of the main slotted lever bars.

In the practical application of our invention the grain cleaning and separating devices are mounted on a suitable frame arranged substantially as shown in the drawings and comprising opposite sets of end uprights $a$—$a$, joined by upper and lower longitudinal side bars $a'$—$a^2$ joined by the vertical side posts $a^5$—$a^5$. Near the lower ends the posts $a^5$—$a^5$ have bearings $b$ in which is journaled the shaft 20 of the blast fan 21 mounted in the lower drum chamber 22 which communicates with the two blast chambers 9—9 that discharge to the rear of the machine and within each of which is pivotally mounted a valve or air board 10—10 whose pivot ends project beyond the sides $22^a$ of the lower drum chamber and carry indicators 1—1 held to their adjusted positions by the clamp screws $1^a$—$1^a$ as clearly shown in Figs. 1 and 2, the said indicators being so positioned that they can be readily adjusted to any point desired to indicate the position of the air blasts. On the opposite ends of the shaft 20 are keyed sprocket pinions 2 to each of which is fastened crank bracket 23, having a slot $23^a$ for adjustably holding the crank or wrist pin 24. The crank or wrist pins 24 work in the long slots 30—30 of a pair of long lever bars 3—3, one at each side of the machine, and whose upper ends extend above the upper frame bars $a'$ and are pivotally hung on the said bars $a'$ as indicated by 31.

H designates the receiving hopper frame which is detachably mounted on the upper side bars $a$—$a$ and which includes a fixed hopper bottom $h$ and an adjustable hopper bottom $h'$ that is longitudinally movable in the said cleats $h^2$ of the frame H and has a pendent ⊓-shaped bracket $h^3$ provided with threaded apertures for receiving the threaded end $i$ of the feed screw I which has a crank handle and is rotatably mounted and held from longitudinal movement in bearings $h^4$ mounted on the under side of a cross bar $h^5$ of the hopper frame, as clearly shown in Fig.

3. By reference to the said Fig. 3, it will be also noticed that the exit throat X of the hopper, (the size of which is increased or diminished by adjusting the bottom member $h'$) discharges on to the upper chaff shoe 60 which comprises a rectangular frame 6, see Fig. 7, having a vertical or head end 61 that has bearings on its outer face for receiving a cross rod 62 mounted at the opposite ends in the upper ends of the side levers 3—3, the connection of the said frame 6 and the rod 62 being such that the frame 6 is fulcrumed so it can be adjusted to the slant desired in the manner presently explained. The chaff shoe 6 has its bottom arranged for receiving screens of different mesh, one of which, 63, is shown in place and is endwise slidable into the front end of the frame 6 for coöperating with a removable frame 64 having a blank surface $64^a$ onto which the grain discharges from the hopper and through which it slides onto the first screen 63, and to this frame 64 is also attached the flexible member 65 (preferably oil cloth) that covers all the screens that are used in the upper frame 6.

7 designates the upper or independent fan drum that has forwardly extended sides, the outer ends of which are vertically slotted as at 71 and held for engaging with the set screws $71^a$—$71^a$. The drum or head portion 72 is pivotally hung as at $72^a$ between the upper side bars $a$—$a$, so the outer or front ends can be raised or lowered by proper adjustment to the set screws $71^a$ and since the said outer ends form the support for the outer end of the upper chaff shoe 60 it follows that the slant of the said chaff shoe can be regulated by adjusting the front end of the fan drum 7. The drum frame 7 has its blast chamber 73 extended forwardly at a point under the inner end of the first screen 63 and within the said chamber 73 is mounted a wind board or valve 75, whose pivotal end carries an indicator 76 that is adjustably held to its set positions by the set screws 77, as shown.

14 designates the upper fan that operates within the drum 7 and is mounted on the shaft $14^a$ journaled in brackets $14^b$ on the under side of the upper side beams $a'$—$a'$ and on one end of the said shaft $14^a$ is fixedly held a sprocket pinion $14^c$ around which takes an endless chain or belt 15 that also takes around the drive sprocket pinion on the lower drum shaft and around the main or drive wheel 13, as clearly shown in the drawings.

8 designates the lower or separating shoe that extends practically the full length of the machine, the rear end thereof being closed at the top and bottom so as to form the discharging chamber 80 for conveying the separations, chaff, etc. over and beyond the lower frame chamber and into the blast or outer chambers 9—9 of the said lower drum chamber.

The shoe 8 may carry any desired number of separating screens but one 81, being shown, and it is rockably mounted on a cross rod 82 whose opposite ends are mounted in hangers 4 pivotally suspended from and vertically adjustable on the main levers 3—3 and for adjusting the said rod 82 in the longitudinal direction of the machine, so as to set the discharge end of the said shoe 8 as desired the brackets 4 have slotted segments 40 in which the clamp bolts 49 carried on the levers 3—3 work, as clearly understood by reference to Fig. 2.

12 designates the chaff box that is loosely mounted at the inner end $12^a$ on the lower frame casing and whose outer end is loosely supported on the bracket pieces $12^b$—$12^b$ that have longitudinal slots $12^c$ and are held for vertical adjustment on the inner face of the uprights $a$ by the set screws $12^d$.

$12^e$ designates a gate in the bottom of the box 12 in which it is slidably held. By providing the brackets $12^b$ the front or outer end of the box 12 on which the outer end of the shoe rests can be readily adjusted on the slant necessary for cleaning and separating the kinds of grain before mentioned.

From the foregoing description, taken in connection with the accompanying drawings, it is believed the complete construction and manner in which our invention operates can be readily understood.

It will be noticed that since the lower blast drum has two separate blast chambers, 10 each of which has independent valves or wind boards that the discharge from the said drum can be controlled from either side thereof. Furthermore, by connecting the drive power with the lower fan in the manner shown and described, the parts can be adjusted to give the stroke or motion desired for separating the different kinds of grain. Furthermore, the motion of the hangers 3—3 serves to give the desired agitation to the upper chaff shoe as well as shaking the lower shoe 8, providing, as it were, a simple and effective means for giving the proper motion and agitation to the shaking devices.

Having thus described our invention, what we claim and desire to secure by Letters Patent, is;—

1. In a machine of the character described, the combination with a main frame, the slotted hanger bars pivotally suspended on the main frame, an upper transverse bar mounted in the hanger bars above their fulcrums, a lower transverse bar mounted in the said hangers below their fulcrums, the upper shoe pivotally mounted at one end on the upper transverse bar, the lower shoe pivotally mounted on the lower transverse bar, a blast fan casing pivotally mounted on the main frame between the upper and lower shoes, a fan in the said casing whose shaft is journaled transversely on the main frame, said shaft having a sprocket wheel at one end, a lower fan and drum, a fan shaft being journaled in the casing and having a sprocket wheel in one end and a disk at the other end, crank members secured on the said fan shaft, sprocket wheel and disk and projected in the slots of the hangers, the drive wheel and an endless chain connection that takes around the said drive wheel and a sprocket wheel on the upper and lower fan shafts.

2. In a machine of the character described, the combination with the main frame, the slotted hanger bars pivotally supported on the main frame, supplemental hanger bars pivotally and adjustably mounted on the slotted hanger bars, an upper transverse bar mounted in the hanger bars above their fulcrums, a lower transverse bar mounted in the supplemental hanger bars and below the fulcrums of the slotted hanger bars, the upper shoe pivotally mounted at one end of the upper transverse bar, the lower shoe pivotally mounted on the lower transverse bar, a blast fan casing pivotally mounted on the main frame between the upper and lower shoes, a fan in the said casing whose shaft is journaled transversely on the main frame, and carries a sprocket wheel at one end, a lower fan and drum, the shaft of the fan being journaled on the main frame and having sprocket wheel at one end and a disk at the other end, crank members secured to the said fan shaft, sprocket wheel and disk, and projected in the slots of the hangers, a drive wheel and an endless chain connection that takes around the said drive wheel and the sprocket wheels on the upper and lower fan shaft.

THOMAS J. HATFIELD.
FREDERICK N. WULLENWABER.

Witnesses:
R. S. NORVAL,
B. F. NORVAL.